United States Patent
Yamaguchi et al.

(10) Patent No.: US 10,882,688 B2
(45) Date of Patent: Jan. 5, 2021

(54) SHEET MATERIAL FOR EXTRACTION, EXTRACTION FILTER, AND EXTRACTION BAG

(71) Applicant: OHKI CO., LTD., Osaka (JP)

(72) Inventors: Naoko Yamaguchi, Osaka (JP); Yoko Mitani, Osaka (JP)

(73) Assignee: OHKI CO., LTD., Osaka (JP)

( * ) Notice: Subject to any disclaimer, the term of this patent is extended or adjusted under 35 U.S.C. 154(b) by 0 days.

(21) Appl. No.: 16/605,746

(22) PCT Filed: May 20, 2017

(86) PCT No.: PCT/JP2017/018940
§ 371 (c)(1),
(2) Date: Oct. 16, 2019

(87) PCT Pub. No.: WO2018/216047
PCT Pub. Date: Nov. 29, 2018

(65) Prior Publication Data
US 2020/0221896 A1    Jul. 16, 2020

(51) Int. Cl.
*B65D 85/808* (2006.01)
*B32B 5/02* (2006.01)
(Continued)

(52) U.S. Cl.
CPC ............ *B65D 85/808* (2013.01); *A47J 31/06* (2013.01); *A47J 31/18* (2013.01); *B01D 11/02* (2013.01);
(Continued)

(58) Field of Classification Search
CPC .... B65D 85/808; B65D 85/812; B65D 77/00; A47J 31/06; A47J 31/18; B01D 11/02;
(Continued)

(56) References Cited

U.S. PATENT DOCUMENTS

| | | |
|---|---|---|
| 2005/0255768 A1 | 11/2005 | Iwasaki et al. |
| 2017/0016157 A1 | 1/2017 | Saitoh et al. |
| 2018/0028014 A1* | 2/2018 | Yamaguchi ............. A47J 31/06 |

FOREIGN PATENT DOCUMENTS

| | | |
|---|---|---|
| JP | H11-076065 A | 3/1999 |
| JP | 2002-336127 A | 11/2002 |

(Continued)

OTHER PUBLICATIONS

Jun. 20, 2017 International Search Report issued in International Patent Application No. PCT/JP2017/018940.
(Continued)

*Primary Examiner* — Elizabeth C Imani
(74) *Attorney, Agent, or Firm* — Oliff PLC

(57) ABSTRACT

A sheet material for extraction with excellent transparency and extraction properties, is less likely to cause powder leakage, and has high modulus and excellent machine adaptability; an extraction filter; and an extraction bag. The sheet material having a first layer of a spunbonded nonwoven fabric formed from polyester-based fibers having an average diameter of 18 to 28 μm, the fabric having a basis weight of 8 to 19 g/m²; and a second layer of a meltblown nonwoven fabric formed from polyester-based fibers having an average diameter of 16 to 28 μm, the fabric having a basis weight of 2 to 8 g/m², wherein the sum of the lengths of all fibers included in 1 cm² of the sheet material for extraction is 3.3 to 4.8 m, and the 3% modulus is 5.5 N or higher; and an extraction filter and an extraction bag formed by this sheet material for extraction.

6 Claims, 2 Drawing Sheets

(51) Int. Cl.
*B32B 5/26* (2006.01)
*D04H 3/011* (2012.01)
*D04H 3/016* (2012.01)
*A47J 31/06* (2006.01)
*A47J 31/18* (2006.01)
*B01D 11/02* (2006.01)
*B32B 7/14* (2006.01)
*B65D 85/812* (2006.01)

(52) U.S. Cl.
CPC ............... *B32B 5/022* (2013.01); *B32B 5/26* (2013.01); *B32B 7/14* (2013.01); *B65D 85/812* (2013.01); *D04H 3/011* (2013.01); *D04H 3/016* (2013.01); *B32B 2262/0276* (2013.01); *B32B 2307/726* (2013.01); *B32B 2439/46* (2013.01); *B32B 2439/70* (2013.01)

(58) Field of Classification Search
CPC .. B32B 5/022; B32B 5/26; B32B 7/14; B32B 2262/0276; B32B 2307/726; B32B 2439/46; B32B 2439/70; D04H 3/011; D04H 3/016

See application file for complete search history.

(56) References Cited

FOREIGN PATENT DOCUMENTS

| | | |
|---|---|---|
| JP | 3939326 B2 | 7/2007 |
| JP | 4944545 B2 | 6/2012 |
| JP | 2015-074838 A | 4/2015 |
| JP | 5933149 B2 | 6/2016 |

OTHER PUBLICATIONS

Jun. 20, 2017 Written Opinion of the International Searching Authority issued in International Patent Application No. PCT/JP2017/018940.

* cited by examiner

SHEET MATERIAL FOR EXTRACTION, EXTRACTION FILTER, AND EXTRACTION BAG

This application is a 371 of PCT/JP2017/018940 filed May 20, 2017.

TECHNICAL FIELD

The present invention relates to a sheet material for extraction capable of extracting a beverage or the like from an extraction material, such as tea leaves, herb, or powdered coffee, and to an extraction filter and an extraction bag (hereinafter, an extraction filter and an extraction bag will be collectively referred to as "filter and the like for extraction") produced by subjecting the sheet material for extraction to processing such as cutting and adhesion. More particularly, the present invention relates to the sheet material for extraction that has excellent transparency and extraction properties, is less likely to cause powder leakage, and has high machine adaptability in the production of a filter and the like for extraction, and to a filter for extraction and the like having excellent handleability and made from the sheet material for extraction.

BACKGROUND ART

Conventionally, the sheet material for extraction as materials for filters and bags are used for extraction of beverages such as black tea, green tea, herbs, and coffee; liquid food products such as soup; medicines such as Chinese herbal medicines, or bathing agents. Many nonwoven fabrics formed from synthetic resins have been employed from the viewpoint of increasing the rate of extraction, reducing the cost, and the like. In recent years, there is a tendency that more emphasis is put on the beauty of the external appearance in the sheet material for extraction, such as a sense of transparency and a sense of glossiness.

Particularly, in a case where bags for extraction is filled with high-quality tea leaves having beautiful green color or various brightly colored herbs as extraction materials, high transparency is required for the sheet material for extraction as the material of the bags such that the beauty of brightly colored tea leaves and herbs can be visually recognized through the sheet material for extraction.

In order to increase the transparency of the sheet material for extraction, for example, the fiber spacing may be widened by shortening the length of fibers included per unit area of the nonwoven fabric that constitutes the sheet material for extraction. In order to do so, the basis weight of the nonwoven fabric may be lowered, and further the fiber diameter may be enlarged if the basis weight is the same.

Furthermore, when the fiber spacing is widened as such in the nonwoven fabric that constitutes the sheet material for extraction, the quantity of airflow is increased, and at the same time permeability to hot water or water is also increased. Therefore, the rate of extraction is increased, i.e., the extraction properties are enhanced.

However, when the fiber spacing is widened in the nonwoven fabric that constitutes the sheet material for extraction, and the extraction filter or the extraction bag is produced by such sheet material for extraction, "powder leakage" by which fine powder included in the extraction material escapes through the fiber spacings is likely to occur. In a case where the powder leakage is severe, the appearance is deteriorated by contaminating the periphery or by leaking a large quantity of fine powder into the beverage or the like, causing a problem that the food taste is deteriorated.

Further, when the basis weight is made lower in the nonwoven fabric that constitutes the sheet material for extraction in order to enhance transparency or extraction properties in the sheet material for extraction, the modulus (tensile stress) is decreased in the sheet material for extraction. Then, when a large tensile force is applied to the sheet material for extraction at the time of processing the sheet material for extraction by a machine or the like, the sheet material for extraction undergoes deformation such as stretching and is not restored to its original shape, which may cause the occurrence of defective products, i.e., which may causes a problem that the machine adaptability is deteriorated for the sheet material for extraction.

For example, when the extraction filter and the like is produced by the elongated sheet material for extraction, a large tensile force may be applied instantaneously upon the initiation of the machine operation or emergency shutdown of the machine. When the modulus is low in the sheet material for extraction, a portion of the sheet material for extraction may be stretched and deformed, and thus defective products may be produced.

Japanese Patent Application Publication No. 2015-74838 (Patent Literature 1) discloses a technology for a food filter formed from a polyester long fiber nonwoven fabric produced by a spun-bonding method. This nonwoven fabric has high transparency, low boiling water shrinkage, high dimensional stability, and excellent extraction properties.

However, since this food filter is formed from a single layer of the spunbonded nonwoven fabric formed from relatively thick fibers having an average fiber diameter of 15 to 40 μm (see claim 1 of Patent Literature 1), the powder leakage tends to occur. Further, no description is given in relation to the increase in the modulus for enhancing the machine adaptability, and this point of view is not taken into consideration.

Japanese Patent No. 3939326 (Patent Literature 2) discloses a technology for a teabag produced from a sheet material having a multilayer structure formed from a nonwoven fabric produced by a spun-bonding method. The teabag has high transparency and is less likely to cause powder leakage.

However, since the nonwoven fabric constructing this teabag has a low quantity of airflow (Frazier method JIS-L-1906) such as 140 to 280 $cc/cm^3/sec$ (see Examples 1 to 6 of Patent Literature 2), the nonwoven fabric possesses insufficient extraction properties. Furthermore, there is no description on the increase in the modulus for enhancing the machine adaptability, and this point of view is not taken into consideration.

Japanese Patent No. 4944545 (Patent Literature 3) discloses a technology for a food filter and its bag body each having a three-layer structure. These are less likely to cause powder leakage and have improved heat sealability and extraction properties.

However, this food filter is produced by interposing a meltblown nonwoven fabric having an average fiber diameter of 1 to 7 μm between a first layer and a third layer each formed from a spunbonded nonwoven fabric, and by thermally compressing the assembly.

Thus, since the average fiber diameter is very fine in the meltblown nonwoven fabric, the nonwoven fabric may have low transparency. Furthermore, there is no description on the increase in the modulus for enhancing the machine adaptability, and this point of view is not taken into consideration.

CITATION LIST

Patent Literature

Patent Literature 1: Japanese Patent Application Publication No. 2015-74838
Patent Literature 2: Japanese Patent No. 3939326
Patent Literature 3: Japanese Patent No. 4944545

SUMMARY OF INVENTION

Technical Problem

The invention was achieved in view of the problems described above, and an object of the invention is to provide a sheet material for extraction, an extraction filter, and an extraction bag each having excellent transparency and extraction properties, being less likely to cause powder leakage, and having high modulus and excellent machine adaptability.

Solution to Problem

Above problems are solved as follows.

[1] A sheet material for extraction includes a first layer including a spunbonded nonwoven fabric formed from polyester-based fibers having an average fiber diameter of 18 to 28 μm and a basis weight of 8 to 19 g/m$^2$; and a second layer including a meltblown nonwoven fabric formed from polyester-based fibers having an average fiber diameter of 16 to 28 μm and a basis weight of 2 to 8 g/m$^2$, wherein the sheet material for extraction has a sum of the lengths of all fibers included in 1 cm$^2$ of the sheet material for extraction of 3.3 to 4.8 m and a 3% modulus of 5.5 N or higher.

[2] The sheet material for extraction described in item [1], wherein the sheet material for extraction has a transparency of 40% or higher, a quantity of airflow of 400 cc/cm$^3$/sec or greater, and a powder leakage rate of 10% or less.

[3] An extraction filter comprising the sheet material for extraction described in item [1] or [2], wherein the extraction filter is formed by superposing the sheet material for extraction with the second layer being disposed on the inner side, and adhering the sheet material for extraction at predetermined sites.

[4] An extraction bag comprising the sheet material for extraction described in item [1] or [2], wherein the extraction bag is formed by superposing the sheet material for extraction with the second layer being disposed on the inner side, and adhering the sheet material for extraction at predetermined sites to form a bag body with which an extraction material has been filled.

Advantageous Effects of Invention

With regard to the sheet material for extraction formed by the nonwoven fabric, when the basis weight of the nonwoven fabric is made small, or the average fiber diameter is made large compared with nonwoven fabrics having the same basis weight, the length of fibers becomes shorter in a unit area of the nonwoven fabric, and the fiber spacing is enlarged, thereby increasing light transmissibility and the quantity of airflow. Accordingly, the transparency and extraction properties of the sheet material for extraction can be enhanced.

However, when the fiber spacing is enlarged in the nonwoven fabric, a powder leakage problem, in which fine powder included in the extraction material leaks out through the fiber spacing and thus contaminates the surroundings or is incorporated into a beverage or the like, is likely to occur.

As such, since the enhancement of transparency and extraction properties and the reduction of powder leakage are contradictory to each other in the sheet material for extraction, generally a compatibility of the two at the same time is difficult to be achieved.

Furthermore, when the basis weight is made small in the nonwoven fabric in order to increase transparency and extraction properties of the sheet material for extraction formed by the nonwoven fabric, the modulus (tensile stress) tends to become smaller in the sheet material for extraction. When the modulus becomes smaller in the sheet material for extraction, it is difficult for the sheet for extraction to be restored to its original shape when the sheet for extraction is subjected to external force and is deformed. Therefore, defective products are likely to be produced during production or processing.

In order to increase the modulus of the sheet material for extraction, for example, increasing the basis weight is desirable in the meltblown nonwoven fabric; however, in that case, the transparency and extraction properties may be deteriorated in the sheet material for extraction.

As a result of a thorough investigation of the inventors of the invention, with regard to a sheet material for extraction having a spunbonded nonwoven fabric layer (first layer) and a meltblown nonwoven fabric layer (second layer) each of layers being formed from polyester-based fibers, the sum of the lengths of the fibers constituting the first layer and the fibers constituting the second layer is regulated to be within a predetermined range in a unit area of the sheet material for extraction. Further, the 3% modulus of the sheet material for extraction is regulated to a predetermined value or greater, while the average fiber diameters and the basis weight of the fibers constituting the respective layers are respectively regulated to be within a predetermined range. The inventors found that such configuration can realize both the enhancement of transparency and extraction properties and the reduction of powder leakage and can prevent the defective products from being generated during production or processing. Thus, the inventors completed the invention.

That is, regarding the sheet material for extraction according to the invention of the above item [1], since the sheet material for extraction comprises a first layer formed by a spunbonded nonwoven fabric formed from polyester-based fibers having an average fiber diameter of 18 to 28 the spunbonded nonwoven fabric having a basis weight of 8 to 19 g/m$^2$; and a second layer formed by a meltblown nonwoven fabric formed from polyester-based fibers having an average fiber diameter of 16 to 28 the meltblown nonwoven fabric having a basis weight of 2 to 8 g/m$^2$, wherein the sum of the lengths of all fibers included in 1 cm$^2$ is 3.3 to 4.8 m in the sheet material for extraction, thereby providing an advantageous effect that highly excellent transparency and extraction properties are obtained, and powder leakage is less likely to occur.

Furthermore, since the sheet material for extraction according to the invention of the above item [1] has a 3% modulus (tensile stress) of 5.5 N or higher, the sheet material for extraction has a property that even when the sheet material for extraction is subjected to external force and is temporarily deformed, the sheet material for extraction tends to restore its original shape.

Therefore, for example, even when the sheet material for extraction is instantaneously subjected to a large tensile force and temporarily undergoes deformation such as stretching upon the initiation of the machine operation or emergency shutdown of the machine while producing the extraction filter and the like from the sheet material for extraction, the sheet material for extraction immediately restores its original shape, and thus damage or permanent deformation thereof cannot easily occur. Therefore, such a sheet material for extraction provides advantageous effects of having high machine adaptability owing to the hardly generation of defective products while the sheet material is processed by the machine.

Meanwhile, the 3% modulus is the stress generated, when the sheet material for extraction attempts to restore the original length after the sheet material for extraction is stretched by 3% of the length of the sheet material. It can be said that as this stress is larger, the restorability to the original length is higher.

Regarding the sheet material for extraction according to the invention of the above item [2], since the sheet material for extraction has a transparency of 40% or higher, the extraction material within the extraction bag can be clearly recognized from the outside of the extraction bag which encapsulates the extraction material and is produced from such a sheet material for extraction. Therefore, the commercial value can be significantly increased particularly for the extraction bag encapsulating tea leaves of beautiful green color or various brightly colored herbs as the extraction material.

Furthermore, regarding the sheet material for extraction according to the invention of the above item [2], since the quantity of airflow is 400 $cc/cm^3/sec$ or higher, passage of hot water or water is easy, and the extraction filter and the like made from such a sheet material for extraction are capable of extracting a beverage or the like through the extraction material in a short period of time. Thus, the sheet material for extraction provides an advantageous effect for providing excellent extraction properties.

Furthermore, regarding the sheet material for extraction according to the invention of the above item [2], since the powder leakage rate is 10% or less, the sheet material for extraction can make it difficult for fine powder included in the extraction material to leak out from the extraction bag which encapsulates the extraction material and is made from this sheet material for extraction. Accordingly, the sheet material for extraction provides an advantageous effect for avoiding the contamination of the machine for producing the extraction bag by fine powder, and reducing the amount of interfusion of fine powder into an extracted beverage or the like, so that the appearance and flavor can be enhanced.

With regard to the extraction filter according to the invention of the above item [3], since the extraction filter is formed by superposing the sheet material for extraction according to the invention of the above item [1] or [2], with the second layer being disposed on the inner side, and adhering the sheet material for extraction at predetermined sites, the transparency and extraction properties are highly excellent, and powder leakage is less likely to occur.

Regarding the extraction bag according to the invention of the above item [4], since the extraction material is encapsulated in the bag body formed by superposing the sheet material for extraction according to the invention of the above item [1] or [2], with the second layer being disposed on the inner side, and adhering the sheet material for extraction at predetermined sites, the extraction material inside the bag body can be easily recognized visually from the outside through the sheet material for extraction having high transparency, and at the same time, the extraction bag has highly excellent extraction properties and is less likely to cause powder leakage.

Therefore, when tea leaves having beautiful green color or various brightly colored herbs as the extraction material are encapsulated in such an extraction bag, the extraction bag having favorable appearance and high commercial value can be obtained.

DESCRIPTION OF EMBODIMENTS

Figure 1:
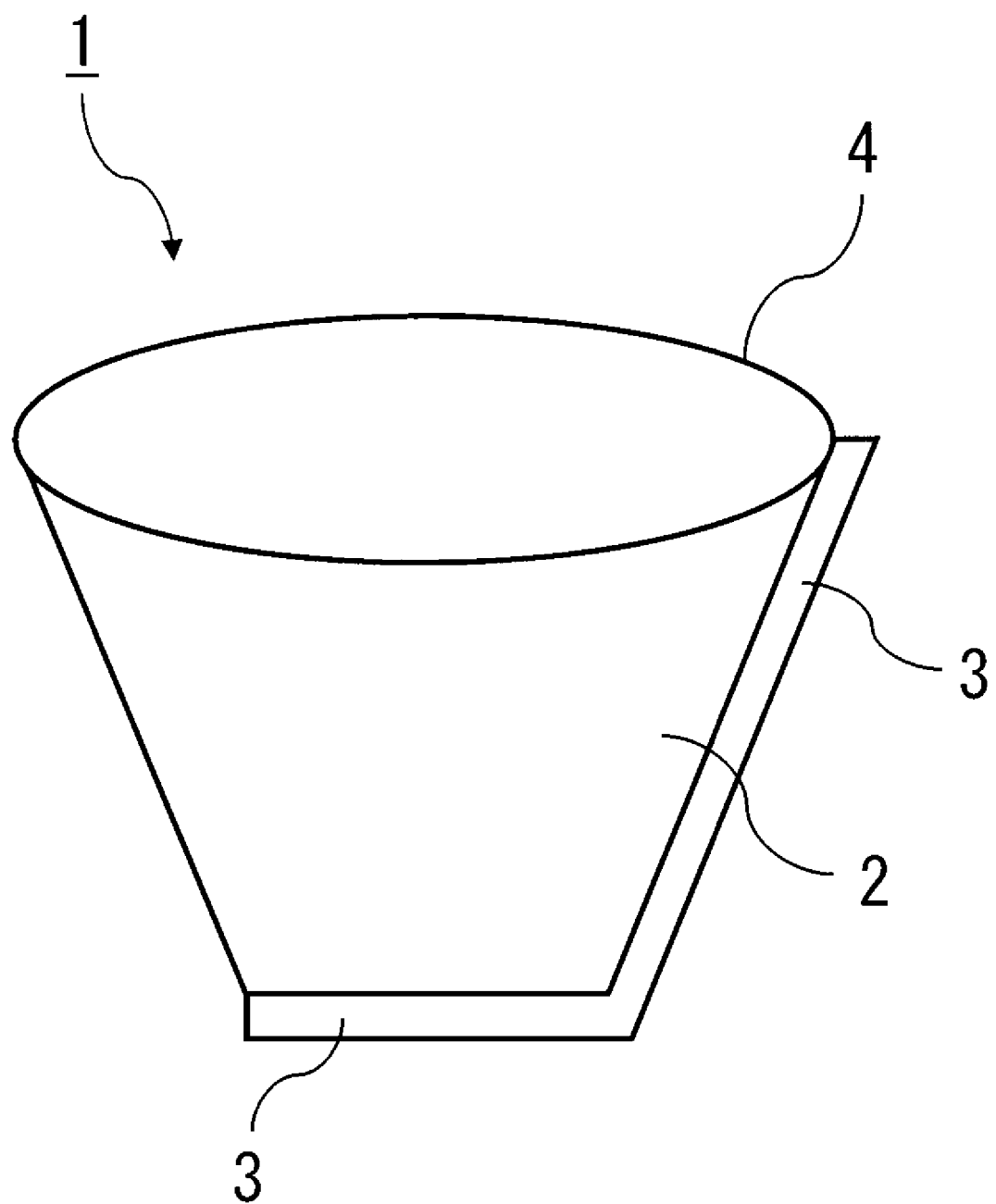
FIG. 1 is a perspective view illustrating an embodiment of an extraction filter according to the invention.

Hereinafter, embodiments of the invention will be described. Meanwhile, the invention is not intended to be limited to these embodiments.

Furthermore, in the invention, a numerical value range represented by the expression "... to ..." means a range including the numerical values described before and after the description "... to ..." as the lower limit and the upper limit.

A sheet material for extraction of the present embodiment is suitable as a material for an extraction filter used by inserting the extraction material into the filter and pouring hot water, water, or the like from above to be filtered therethrough, such as an extraction filter of powdered coffee, which is used by mounting the extraction filter on a funnel-shaped dripper. Furthermore, the sheet material for extraction is suitable as a material for an extraction bag that is a bag body encapsulating an extraction material, which is used by being immersed in hot water, water, or the like, such as a teabag.

Here, the extraction material includes, in a broad sense, a beverage material, a food material, a pharmaceutical product, a quasi-drug, and the like, from which components are extracted into hot water, water, or alcohol. Examples include tea leaves such as green tea, black tea, roasted green tea, oolong tea, and du zhong tea; barley tea; flowering tea; powdered coffee; dried fish shavings such as dried bonito shavings and dried smoked mackerel shavings; dried kelp for soup stock; dried sardines; Chinese herbal medicines; and bathing agents.

The sheet material for extraction of the present embodiment has a first layer formed by a spunbonded nonwoven fabric and a second layer formed by a meltblown nonwoven fabric laminated together, and these nonwoven fabrics are formed from polyester-based resin fibers.

Here, the polyester-based resin is a linear polyester, a copolymer polyester, or the like and can employ, for example, polyethylene terephthalate, polybutylene terephthalate, or a polyethylene terephthalate/polyethylene isophthalate copolymer in which the polymerization ratio of the acidic components, namely, terephthalic acid/isophthalic acid, has been adjusted to an appropriate range. Furthermore, the polyester-based resin can employ a product obtained by polymerizing terephthalic acid as a main component with 5-sodium sulfoisophthalate, 4-hydroxybenzoic acid, adipic acid, naphthalenedicarboxylic acid, phthalic acid, naphthalenecarboxylic acid, diethylene glycol, propylene glycol, 1,4-butanediol, pentaerythritol, or the like at an appropriate ratio, instead of isophthalic acid.

Furthermore, in the polyester-based resin used for the sheet material for extraction, other conventionally used components can be added to the extent without impairing the effects of the invention. For example, additives can be added as appropriate such as impact modifiers as various elastomers, a nucleating agent, a coloration preventing agent, a delustering agent, an oxidation inhibitor, a heat-resistant agent, a plasticizer, a lubricating agent, a weather-resistant agent, a coloring agent, a pigment, or the like.

The form of the fibers of the respective nonwoven fabrics forming the first layer and the second layer of the sheet material for extraction of the present embodiment can employ a monofilament, a multifilament, a composite fiber having a core-sheath structure combining two kinds of resins, or the like. Furthermore, the cross-sectional shape of these fibers is not necessarily required to be a circular shape, and the shape may be various shapes such as an oval shape, a triangular shape, and other polygonal shapes, or may also be a hollow shape.

The spunbonded nonwoven fabric forming the first layer of the sheet material for extraction is a nonwoven fabric formed from relatively long fibers produced by a "spun-bonding method". Furthermore, generally, the spun-bonding method is a production method of heating and melting a raw material resin, extruding the molten resin through a spinning nozzle, pulling and stretching this extrusion product by spraying air at high speed thereto while cooling to form fibers, subsequently accumulating the fibers on a collector such as a conveyor to form a web, subsequently adjusting the thickness of the obtained web or subjecting the web to a partial thermal compression treatment, using a flat roll, an embossed roll, or the like, which has been heated or not heated as necessary.

Meanwhile, during the partial thermal compression treatment, for example, the above-mentioned web may be passed through between a pair of rolls composed of the embossed roll having an uneven surface structure and the flat roll having a smooth surface to form a thermally compressed part uniformly dispersed over the entirety of the spunbonded nonwoven fabric. Meanwhile, the area ratio of the thermally compressed part (thermal compression area ratio) is preferably 5.0% to 30.0% with respect to the entire area of the nonwoven fabric surface, and softening of the resin at the time of the partial thermal compression treatment can be carried out by any arbitrary means such as heating by a heater or vibrating with ultrasonic waves.

The spunbonded nonwoven fabric forming the first layer has an average fiber diameter of 18 to 28 When the average fiber diameter is larger than 28 the fiber length per unit area becomes short in the spunbonded nonwoven fabric, the fiber spacing becomes excessively wide, and then powder leakage tends to occur easily. Further, when the average fiber diameter is smaller than 18 the fiber length per unit area becomes long in the spunbonded nonwoven fabric, the fiber spacing becomes excessively narrow, and transparency and extraction properties tend to deteriorate.

Meanwhile, the "average fiber diameter" is the average value of the thickness of the fibers constituting the nonwoven fabric. When the cross-sectional shape of the fibers is a circular shape, the average fiber diameter is an average value of the diameter of the fibers. When the cross-sectional shape of the fibers is other than a circular shape, the average fiber diameter is an average value of the diameter obtainable in the case of converting the cross-sectional shape to a circular shape having virtually the same area.

The spunbonded nonwoven fabric that forms the first layer has a basis weight of 8 to 19 g/m$^2$. When the basis weight is more than 19 g/m$^2$, the fiber length per unit area becomes long in the spunbonded nonwoven fabric, the fiber spacing becomes excessively narrow, and then transparency and extraction properties tend to deteriorate. Further, when the basis weight is less than 8 g/m$^2$, the tensile strength becomes smaller due to the shortening of the fiber length per unit area in the spunbonded nonwoven fabric, and the sheet material for extraction tends to be easily damaged.

Meanwhile, in the spunbonded nonwoven fabric forming the first layer, a nonwoven fabric other than the spunbonded nonwoven fabric, e.g., a nonwoven fabric produced by another spinning method, or another material can be incorporated to the extent without impairing the effects of the invention. The mixing ratio of such other nonwoven fabric or the like is preferably approximately 10% or less with respect to the spunbonded nonwoven fabric.

Next, the second layer of the sheet material for extraction of the present embodiment is formed by the meltblown nonwoven fabric. The meltblown nonwoven fabric is a nonwoven fabric produced by a "melt-blowing method". Generally, the melt-blowing method is a production method of heating and melting a raw material resin, extruding the molten resin through a spinning nozzle, subjecting the extrusion product to a high-temperature air stream to produce the extrusion product into a fibrous form while scattering the fibers, spraying the fibers on the surface of a conveyor or a collector such as another nonwoven fabric to accumulate thereon, and then solidifying the fibers.

Since the meltblown nonwoven fabric is produced by accumulating a heated and melted resin having fibrous form before the resin is completely solidified, the meltblown nonwoven fabric has a feature that fibers are adhered in many parts. Therefore, the meltblown nonwoven fabric has relatively high modulus, and even if the nonwoven fabric is subjected to external force and is temporarily deformed, the nonwoven fabric can easily restore its original shape upon releasing the external force.

Meanwhile, the softening point of the fibers constituting the meltblown nonwoven fabric of the second layer is preferably made lower than the softening point of the fibers constituting the spunbonded nonwoven fabric of the first layer. Then, on the occasion of producing the extraction filter and the like using the sheet material for extraction of the present embodiment, for example, when two sheets of the sheet material for extraction are arranged such that the second layers of the respective sheets face each other, and the two sheets are adhered at predetermined sites and subjected to a sealing treatment, the meltblown nonwoven fabric of the second layer having a low softening point is melted and caused to function as an adhesive material. Further, the sheets of the sheet material for extraction can be subjected to a sealing treatment while retaining the form of the sheet material for extraction, without softening the spunbonded nonwoven fabric of the first layer having a high softening point.

Particularly, when the difference between the softening point of the fibers constituting the spunbonded nonwoven fabric of the first layer and the softening point of the fibers constituting the meltblown nonwoven fabric of the second layer is adjusted to be as large as 30° C. or greater, and more preferably 40° C. or greater, the meltblown nonwoven fabric can be heated to a temperature significantly higher than the softening point thereof at the time of the sealing treatment, thereby melting the meltblown nonwoven fabric in a very short period of time. Therefore, the time taken for the sealing treatment can be shortened, and furthermore, the time for producing the extraction filter and the like can be shortened. Thus, the production efficiency can be increased.

Furthermore, when the meltblown nonwoven fabric of the second layer is melted at high temperature, the resin can be sufficiently fluidized, and for example, such a molten resin can be caused to infiltrate deeply into the fiber spacings in the spunbonded nonwoven fabric by the compression force exerted by a sealing bar. Therefore, an anchor effect is produced, and high seal strength can be obtained.

Meanwhile, any known sealing treatment method such as adhesion by a heat sealing bar or adhesion by ultrasonic vibration can be widely applied for the sheet material for extraction of the present embodiment.

In order to regulate the softening point of the spunbonded nonwoven fabric of the first layer, the spinning speed may be regulated as appropriate at the time of spinning the constituent fibers. Furthermore, the softening point can also be regulated by mixing raw material resins having different molecular weights as appropriate, or adding various additives.

Furthermore, in order to regulate the softening point of the meltblown nonwoven fabric of the second layer, the heating temperature for melting the raw material polyester-based resin fibers may be regulated as appropriate at the time of spinning the constituent, or the temperature of the air stream applied to the molten resin having fibrous form may be regulated as appropriate. Furthermore, the softening point can also be regulated by mixing raw material resins having different molecular weights as appropriate, or adding various additives.

The meltblown nonwoven fabric of the second layer has an average fiber diameter of 16 to 28 μm. When the average fiber diameter is larger than 28 μm, the fiber length per unit area becomes short in the meltblown nonwoven fabric, the fiber spacings become excessively wide, powder leakage is likely to occur easily, and thus production of the meltblown nonwoven fabric tends to become difficult. Further, when the average fiber diameter is smaller than 16 μm, the fiber length per unit area becomes long in the spunbonded nonwoven fabric, the fiber spacings become excessively narrow, and transparency and extraction properties tend to deteriorate.

The meltblown nonwoven fabric that forms the second layer has a basis weight of 2 to 8 $g/m^2$. When the basis weight is more than 8 $g/m^2$, the fiber length per unit area becomes long in the meltblown nonwoven fabric, the fiber spacings become excessively narrow, and transparency and extraction properties tend to deteriorate. Further, when the basis weight is less than 2 $g/m^2$, since the fiber length per unit area becomes short in the meltblown nonwoven fabric, the modulus is decreased, and there is a tendency that the sheet material for extraction is likely to be permanently deformed by external force.

Meanwhile, in the meltblown nonwoven fabric that forms the second layer, a nonwoven fabric other than the meltblown nonwoven fabric, e.g., a nonwoven fabric produced by another spinning method, or another material can be incorporated to the extent without impairing the effects of the invention. The mixing ratio of such other nonwoven fabric or the like is preferably approximately 10% or less with respect to the meltblown nonwoven fabric.

Next, a method for laminating the first layer and the second layer of the sheet material for extraction of the present embodiment will be described.

First, the first layer comprising the spunbonded nonwoven fabric is formed according to the spun-bonding method. This spunbonded nonwoven fabric may be in a web form in which spun fibers are merely accumulated, or may be a product of partial thermal compression treatment obtained by passing the web between heated embossed rolls or the like.

Next, the second layer comprising the meltblown nonwoven fabric can be formed on the surface of this first layer by spraying, accumulating, and solidifying a fibrous molten resin at a high temperature according to the meltblown method.

At that time, when the softening point of the resin that forms the meltblown nonwoven fabric is made lower than the softening point of the resin that forms the spunbonded nonwoven fabric, the resin of the meltblown nonwoven fabric can be melted at a high temperature to the extent that the resin of the spunbonded nonwoven fabric is not softened. Therefore, even in a case where a fibrous molten resin is sprayed at a high temperature on the surface of the spunbonded nonwoven fabric according to the meltblown method, the meltblown nonwoven fabric can be formed on the surface of the spunbonded nonwoven fabric without deforming the spunbonded nonwoven fabric, and can adhere the spunbonded nonwoven fabrics.

Furthermore, by such a lamination method, the fibers of the meltblown nonwoven fabric infiltrate into the fiber spacings of the spunbonded nonwoven fabric and then are solidified. Therefore, the so-called anchor effect is produced, and the two nonwoven fabrics can be strongly adhered, which is therefore preferable.

As to the sheet material laminated and formed as such, the thickness may be adjusted by applying a pressing force over the entire surface using the flat roll as necessary, or may be subjected to the partial thermal compression treatment using the embossed roll.

Furthermore, when a process forming the spunbonded nonwoven fabric and a process forming the meltblown nonwoven fabric are carried out successively in a so-called in-line mode, the production efficiency can be increased, which is therefore preferable.

Besides, regarding another method for laminating the first layer and the second layer, the spunbonded nonwoven fabric and the meltblown nonwoven fabric may be separately produced and then be superposed, this assembly may be subjected to the partial thermal compression treatment using the embossed roll or the like, and thus the two nonwoven fabrics may be integrated.

Meanwhile, the sheet material for extraction of the invention can be produced into the sheet for extraction comprising three or more layers by further laminating another nonwoven fabric, a woven fabric, or the like, to the extent without impairing the effects of the invention.

The sheet material for extraction of the present embodiment obtained by the lamination method described above is such that the sum of the lengths of all fibers included in 1 $cm^2$ (hereinafter, referred to as "total fiber length") is 3.3 to 4.8 m. In a case where the sheet material for extraction is composed of two layers of the first layer and the second layer only, the total fiber length is adjusted to 3.3 to 4.8 m by summing the lengths of fibers included in 1 $cm^2$ of the spunbonded nonwoven fabric forming the first layer and the lengths of fibers included in 1 $cm^2$ of the meltblown nonwoven fabric framing the second layer.

When the total fiber length is 3.3 to 4.8 m in the sheet material for extraction, the sheet material for extraction can simultaneously solve contradictory problems of the enhancement of transparency and extraction properties, and the reduction of powder leakage.

For example, as to the sheet material for extraction composed of the first layer and the second layer described above, provided that the total fiber length of the fibers constituting the two layers is regulated to the predetermined range, as the length of the fibers constituting the first layer is lengthened to narrow the fiber spacing, the length of the fibers constituting the second layer becomes relatively shorter, and the fiber spacing becomes wide. In contrast, when the length of the fibers constituting the first layer is shortened to widen the fiber spacing, the length of the fibers constituting the second layer becomes relatively longer, and the fiber spacing becomes narrow. Therefore, the fiber spacings come into a moderately well-balanced state over the entirety of the sheet material for extraction, thereby obtaining the sheet material for extraction having excellent transparency and extraction properties and less likely to cause powder leakage.

In this case, the transparency is preferably 40% or higher in the sheet for extraction. Furthermore, the quantity of airflow, which serves as an indicator for extraction properties, is preferably 400 cc/cm$^3$/sec or higher. Moreover, the powder leakage rate is preferably 10% or less.

In a case where the total fiber length is more than 4.8 m in the sheet material for extraction, the fiber spacings of the nonwoven fabric constituting the sheet material for extraction becomes excessively narrow, and transparency and extraction properties are deteriorated. Further, in a case where the total fiber length is shorter than 3.3 m in the sheet material for extraction, the fiber spacings of the nonwoven fabric constituting the sheet material for extraction become excessively wide, and powder leakage easily occurs.

As to the sheet material for extraction of the present embodiment, the 3% modulus needs to be adjusted to 5.5 N or greater, and more preferably to 6.0 N or greater.

Generally, since fibers constituting the nonwoven fabric are adhered at many parts in the meltblown nonwoven fabric, the movable range of the respective fibers tends to be limited. On the other hand, the spunbonded nonwoven fabric has high tensile strength and is sturdy; however, since there are fewer adhered parts between the fibers, the movable range of the respective fibers tends to become wide. Such tendency is particularly noticeably exhibited in a case where the basis weight is small as in the present embodiment.

Since the sheet material for extraction of the present embodiment has the meltblown nonwoven fabric and the spunbonded nonwoven fabric laminated together, the fibers of the spunbonded nonwoven fabric having fewer adhered parts are connected to the meltblown nonwoven fabric having many adhered parts. Therefore, this sheet material for extraction is sturdy as a whole, and since the movable range of the respective fibers is narrow, consequently the modulus can be made high.

In order to further increase the modulus of the sheet material for extraction, for example, it is desirable to increase the basis weight of the meltblown nonwoven fabric of the second layer. In order to increase the 3% modulus to be 5.5 N or greater, it is preferable to adjust the basis weight of the meltblown nonwoven fabric of the second layer to be 2 g/m$^2$ or higher. In order to increase the 3% modulus to be 6.0 N or greater, it is preferable to adjust the basis weight of the second layer to be 4 g/m$^2$ or higher.

However, depending on the state of the spunbonded nonwoven fabric of the first layer, even when the basis weight of the second layer is adjusted to be 2 g/m$^2$ or higher, the 3% modulus may become smaller than 5.5 N in the sheet material for extraction. Therefore, the average fiber diameter, the basis weight, and the like of the spunbonded nonwoven fabric of the first layer may be regulated in consideration of this point of view.

Since the sheet material for extraction of the present embodiment has its 3% modulus adjusted to be 5.5 N or greater, the sheet material for extraction can easily restore its original shape, even when the sheet material for extraction is subjected to external force and is temporarily deformed. For example, even when the sheet material for extraction is instantaneously subjected to a large tensile force and temporarily undergoes deformation such as stretching upon the initiation of machine operation or emergency shutdown while the extraction filter and the like are produced using the sheet material for extraction, the sheet material for extraction immediately restores its original shape, and damage or permanent deformation cannot easily occur.

Therefore, regarding the sheet material for extraction of the present embodiment, defective products and the like cannot be easily produced in a case where the sheet material for extraction is processed using the machine, and the sheet material for extraction has high machine adaptability.

Next, the embodiment of an extraction filter produced using the sheet material for extraction of the invention will be described on the basis of FIG. 1.

An extraction filter 1 is a drip coffee filter mounted on and used in a funnel-shaped dripper (not illustrated in the drawing), and planarly adhered portions 3 are provided at the bottom side and a lateral side of an approximately inverted trapezoidal-shaped filter portion 2, with the second layers of the sheet material for extraction being disposed on the inner side. At the time of use, an upper edge 4 is opened, the filter is shaped into a mortar shape, powdered coffee is inserted through the opened upper edge 4, hot water is applied thereto from the above to be filtered, and thus a coffee beverage is extracted.

In order to produce the extraction filter 1, for example, the extraction filter 1 may be produced by using a continuous long-shaped sheet material for extraction as an original fabric, cutting out the sheet material for extraction into a predetermined shape using a known shaping machine, and planarly adhering the sheet material for extraction.

Meanwhile, the adhesion method other than planar adhesion can be employed such as adhesion by ultrasonic vibration, or adhesion-cutting-sealing of performing cutting and adhesion of the sheet for extraction simultaneously.

The extraction filter 1 produced as such has superior extraction properties for coffee beverage and exhibits reduced powder leakage.

Meanwhile, the shape of the extraction filter 1 is not limited to the approximately inverted trapezoidal shape illustrated in FIG. 1, and can be produced into an arbitrary shape such as an approximately inverted triangular shape or a disc shape. Furthermore, there are no particular limitations on the size or the method of use.

Next, the embodiment of an extraction bag produced using the sheet material for extraction of the invention will be described on the basis of FIG. 2.

An extraction bag 5 is a product that is generally called teabag, and comprises a bag body 6 formed into a tetra-form (tetrahedral form) using the above-described sheet material for extraction; a tag 9 for picking up the extraction bag 5 with fingertips when the extraction bag 5 is used; and a tagging thread 8 having one end adhered to the upper end of the bag body 6 and the other end adhered to the tag 9. The bag body 6 is formed into a bag shape by disposing the second layers of the sheet material for extraction on the inner side, and forming a linear adhered portion 7 along the edge portion of the respective sides by ultrasonic vibration, and dried tea leaves for green tea as the extraction material (not illustrated in the drawing) are encapsulated in the inside of the bag body.

In the case of using such an extraction bag 5, for example, the tag 9 may be held with fingertips, the bag body 6 may be immersed into a cup containing hot water for a time of from several seconds to several minutes, and then the dried tea leaves inside the bag body 6 may be infused with hot water to elute green tea components.

Regarding the method for forming the bag body 6, for example, the bag body 6 may be formed from the above-described sheet material for extraction having a continuous long shape as the original fabric by cutting and linearly adhering the sheet material for extraction using a known shaping and filling machine while dried tea leaves is filled and sealed therein. At that time, linear adhesion of the bag body 6 can be performed by applying vibration to the adhesion-intended sites of the sheet material for extraction using ultrasonic waves and increasing its temperature.

Meanwhile, other adhesion method can be employed such as planar adhesion based on pinching with a heat sealing bar and adhesion-cutting-sealing of simultaneously performing cutting and adhesion of the sheet for extraction and the like.

The bag body 6 thus formed has excellent transparency, and the beautiful green color of the tea leaves encapsulated inside the bag body 6 can be sufficiently visually recognized from the outside. Furthermore, the bag body 6 has high extraction properties for green tea and causes less powder leakage.

Figure 2:
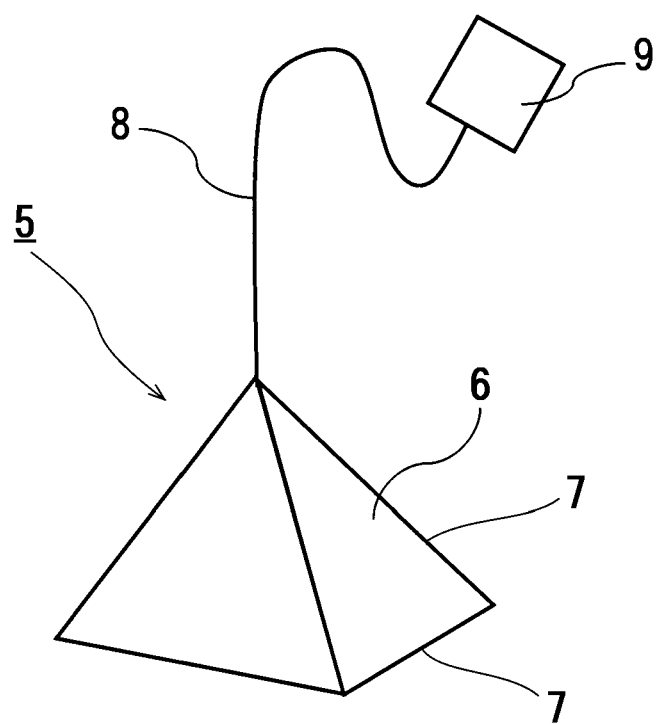
FIG. 2 is a perspective view illustrating an embodiment of an extraction bag according to the invention.

Meanwhile, the shape of the bag body 6 is not limited to the tetra-form illustrated in FIG. 2, and any arbitrary shape can be employed such as a pillow shape, a pyramid shape, a disc shape, or a stick shape. Furthermore, there are no particular limitations on the size and capacity of the bag body 6, and method of use. In addition, it is also possible to temporarily affix the tagging thread 8 and the tag 9 to the surface of the bag body 6 with a force to the extent that can be easily peeled off at the time of use.

The extraction bag 5 after production is preferably packaged per one each or a plurality of the bag bodies 6 in an external bag formed from a resin film, paper, or the like, which is not illustrated in the drawing, or in an external container, in order to maintain the flavor of the tea leaves inside the bag body 6 and to prevent contamination or damage.

EXAMPLES

Hereinafter, the invention will be specifically described by way of Examples; however, the invention is not intended to be limited to these Examples.

First, methods for measuring or testing various indicators according to the invention will be described.

(1) Average Fiber Diameter (Unit: μm)

For the fibers of a nonwoven fabric as a test object, the diameters were measured at ten sites by visual inspection using an optical microscope, and the average value was determined.

(2) Basis Weight (Unit: $g/m^2$)

A specimen that measured 10 cm on each of four sides was collected from a nonwoven fabric as a test object according to JIS L-1906, the mass was measured, and the basis weight was calculated.

(3) Total Fiber Length (Sum of the Lengths of all Fibers Included in 1 $cm^2$ of the Sheet Material for Extraction, Unit: m)

First, the sum $I_1$ (m) of the lengths of fibers of the nonwoven fabric of the first layer included in 1 $cm^2$ of the sheet material for extraction as a test object was calculated by the following formula from the average fiber diameter $d_1$ (μm) of the nonwoven fabric of the first layer, the basis weight $w_1$ ($g/m^2$) of the nonwoven fabric of the first layer, and the density 1.38 $g/cm^3$ of polyethylene terephthalate.

$$I_1=(4\times10^2\times w_1)/(1.38\times\pi\times d_1^2)$$

Next, the sum $I_2$ (m) of the lengths of fibers of the nonwoven fabric of the second layer included in 1 $cm^2$ of the sheet material for extraction as a test object was calculated by the following formula from the average fiber diameter $d_2$ (μm) of the nonwoven fabric of the second layer, the basis weight $w_2$ ($g/m^2$) of the nonwoven fabric of the second layer, and the density 1.38 $g/cm^3$ of polyethylene terephthalate.

$$I_2=(4\times10^2\times w_2)/(1.38\times\pi\times d_2^2)$$

The sum of $I_1$ and $I_2$ calculated as described above was determined, and the sum was designated as the total fiber length.

(4) 3% Modulus (Unit: N)

A band-shaped specimen of the sheet material for extraction, which measured 100 mm in the longitudinal direction and 15 mm in the width direction, was collected from a long-shaped sheet material for extraction as a test object. With this specimen, the tensile strength in the longitudinal direction of the sheet material for extraction was measured using a digital force gauge (manufactured by IMADA CO., LTD., product name ZTA-50N) and a measuring stand (manufactured by IMADA CO., LTD., product name MX2-500N) while the conditions were set to a length of specimen between grips of 50 mm and a speed of 100 mm/min. The load at the time of 3% (1.5 mm) elongation was read out using an affiliated driver software program, and this load was designated as the 3% modulus.

(5) Transparency (Unit: %)

A specimen collected from the sheet material for extraction as a test object was irradiated with visible light (wavelength 380 to 780 nm), and the proportion (%) of transmitted light to the light incident with respect to the nonwoven fabric was measured using a spectrophotometer (manufactured by Hitachi High-Technologies Corporation, product name U-3900H).

(6) Quantity of Airflow (Unit: $cc/cm^3/sec$)

A specimen collected from the sheet material for extraction as a test object was mounted on an attachment having a diameter of 36 mm using an air permeability testing machine (manufactured by YASUDA SEIKI SEI-SAKUSHO, LTD.), and the quantity of airflow was measured by the method according to Frazier method (JIS-L-1906).

(7) Powder Leakage Rate (Unit: %)

A specimen collected from the sheet material for extraction as a test object was mounted on a screen frame having a diameter of 7.2 cm, and about 10 g of glass beads BZ-04 (particle size 350 to 500 μm, handled by AS-ONE Corporation) weighed up to the digit of 0.001 g were rested on the above-described nonwoven fabric and were shaken for 14 minutes at a speed of vibration of 213 rpm using a shaking tester (manufactured by IKA Japan, product name Digital Shaker HS501). Then, glass beads that had passed through the nonwoven fabric were weighed up to the digit of 0.001 g.

The weighed mass of glass beads before screening was designated as W1 (g), and the weighed mass of glass beads that had passed through the nonwoven fabric was designated as W2 (g). Thus, the powder leakage rate was calculated by the following formula.

Powder leakage rate (%)=(W2/W1)×100

Example 1

Sheet Material for Extraction

Polyethylene terephthalate that had been heated and melted was extruded through the spinning nozzle into a fibrous form, and the resin in the fibrous form was stretched at a spinning speed of 5,000 m/min using an ejector while being cooled, to form long fibers. Those long fibers were accumulated on the belt conveyor that moved at a constant speed, and thus the spunbonded nonwoven fabric (first layer) was formed.

Next, a polyester (the polymerization ratio of terephthalic acid/isophthalic acid in acid components is 86/14) that had been heated and melted was extruded through the spinning nozzle into a fibrous form, and the resin in the fibrous form was subjected to an air stream heated to 370° C. and was scattered. The resin in a fibrous form was sprayed, accumulated, and solidified on the surface of the spunbonded nonwoven fabric that moved at a constant speed, and the meltblown nonwoven fabric (second layer) was formed thereon. At the same time, the two nonwoven fabrics were adhered, subsequently the thickness was adjusted to 80 μm by passing the adhered nonwoven fabrics through between flat rolls, and thus the long-shaped sheet material for extraction was produced.

With regard to the sheet material for extraction thus obtained, the average fiber diameter of the spunbonded nonwoven fabric that formed the first layer was 21 and the basis weight was 16 g/m². Besides, the average fiber diameter of the meltblown nonwoven fabric that formed the second layer was 18 and the basis weight was 4 g/m².

Furthermore, with regard to this sheet material for extraction, the sum of the lengths of all fibers (total fiber length) included in 1 cm² was 4.49 m in the sheet material for extraction, the 3% modulus was 6.3 N, transparency was 43.1%, the quantity of airflow was 445 cc/cm³/sec, and the powder leakage rate was 7.5%.

Example 2

Extraction Bag Illustrated in FIG. 2

The long-shaped sheet material for extraction of Example 1 described above was mounted on the shaping and filling machine, and the tetra-shaped bag body 6 was formed by linearly adhering predetermined sites by ultrasonically vibrating the sheet material for extraction while dried tea leaves of green tea were encapsulated therein. Thus, the extraction bag 5 was produced.

During the production of the extraction bag 5, partial deformation such as stretching of the sheet material for extraction did not occur, thereby avoiding the generation of defective products caused by deformation of the sheet material for extraction.

Furthermore, the extraction bag 5 thus produced was such that 2 g of dried tea leaves were encapsulated in the tetra-shaped bag body 6 having each side length of 55 mm and having linearly adhered portions 7 formed along the edge of the respective sides. Thus, the dried tea leaves inside the bag body 6 were clearly visible through the sheet material for extraction that formed the bag body 6, and the green color of the tea leaves was felt beautiful.

Furthermore, this extraction bag 5 was immersed into hot water at about 95° C. for 1 minute, and during the time, the extraction bag was reciprocatingly shaken about 10 times to produce green tea. Hot water infusion of the dried tea leaves could extract green tea to a satisfactory concentration quickly in a short time period, and then powder leakage almost failed to occur.

Test Example

Samples a to t of twenty kinds of sheet material for extraction were produced as shown in the following Table 1 and Table 2. The samples thus obtained were measured for the average fiber diameter and basis weight of the nonwoven fabric in the first layer, and the average fiber diameter and the basis weight in the second layer, and further the total fiber length, 3% modulus, transparency, quantity of airflow, and powder leakage rate in the sheet material for extraction. The results are presented in Table 1 and Table 2.

Meanwhile, samples a to i shown in Table 1 are "samples of Examples" that satisfy the requirements of the invention, and samples j to t shown in Table 2 are "samples of Comparative Examples" that do not satisfy the requirements of the invention.

The methods for producing the respective samples are as follows.

Sample a: This sample is an equivalent product produced by the same method as the sheet material for extraction of Example 1 described above.

Samples b, q, and r: The spinning speed by the ejector and the speed of movement of the belt conveyor were changed as appropriate while forming the spunbonded nonwoven fabric of the first layer in the production of the sheet for extraction of Example 1. Other conditions of manufacture were the same manner as that of Example 1.

Samples d, e, g, k, and n: The heating temperature for melting the raw material polyester, the temperature of the air stream applied to the molten resin extruded through the spinning nozzle, and the speed of movement of the spunbonded nonwoven fabric of the first layer were changed as appropriate while forming the meltblown nonwoven fabric of the second layer in the production of the sheet for extraction of Example 1. Other conditions of manufacture were the same manner as that of Example 1.

Samples c, f, h, i, j, l, m, o, and p: The spinning speed by the ejector and the speed of movement of the belt conveyor were changed as appropriate while forming the spunbonded nonwoven fabric of the first layer in the production of the sheet for extraction of Example 1. Further, the heating temperature for melting the raw material polyester, the temperature of the air stream applied to the molten resin extruded through the spinning nozzle, and the speed of movement of the spunbonded nonwoven fabric of the first layer were changed as appropriate while forming the meltblown nonwoven fabric of the second layer. Other conditions of manufacture were the same manner as that of Example 1.

Samples s and t: The spinning speed by the ejector and the speed of movement of the belt conveyor were changed as appropriate while forming the spunbonded nonwoven fabric of the first layer in the production of the sheet for extraction of Example 1. The meltblown nonwoven fabric of the second layer was not laminated, and other conditions of manufacture was the same manner as that of Example 1.

TABLE 1

| | | Sample | | | | | | | | |
|---|---|---|---|---|---|---|---|---|---|---|
| | | a | b | c | d | e | f | g | h | i |
| Sheet Material for Extraction | Total Fiber Length (m/cm$^2$) | 4.49 | 3.31 | 3.61 | 4.79 | 4.07 | 4.26 | 4.29 | 3.89 | 3.42 |
| | Basis Weight (g/m$^2$) | 20 | 16 | 22 | 20 | 18 | 14 | 24 | 12 | 23 |
| | 3% Modulus (N) | 6.3 | 5.8 | 7.1 | 6.2 | 5.5 | 5.6 | 6.8 | 5.5 | 7.4 |
| | Transparency (%) | 43.1 | 52.1 | 48.6 | 41.7 | 46.1 | 42.1 | 41.5 | 48.6 | 45.3 |
| | Quantity of Airflow (cc/cm$^3$/sec) | 445 | 662 | 551 | 429 | 480 | 435 | 402 | 485 | 521 |
| | Powder Leakage Rate (%) | 7.5 | 8.44 | 9.02 | 3.51 | 8.1 | 7.92 | 4.02 | 9.53 | 8.14 |
| First Layer | Average Fiber Diameter (μm) | 21 | 22.6 | 27.7 | 21 | 21 | 18.1 | 21 | 18.1 | 27.7 |
| | Basis Weight (g/m$^2$) | 16 | 12 | 18 | 16 | 16 | 10 | 16 | 8 | 19 |
| Second Layer | Average Fiber Diameter (μm) | 18 | 18 | 16 | 16 | 16 | 16 | 28 | 16 | 16 |
| | Basis Weight (g/m$^2$) | 4 | 4 | 4 | 4 | 2 | 4 | 8 | 4 | 4 |

From Table 1 described above, the following matters can be understood.

In a case where the average fiber diameter is 18 to 28 μm in the spunbonded nonwoven fabric of the first layer of the sheet material for extraction, the basis weight is 8 to 19 g/m$^2$ therein, the average fiber diameter is 16 to 28 μm in the meltblown nonwoven fabric of the second layer, the basis weight is 2 to 8 g/m$^2$ therein, and the total fiber length is 3.3 to 4.8 m in the sheet material for extraction, the 3% modulus is 5.5 N or higher in the sheet material for extraction, transparency is 40% or higher, the quantity of airflow is 400 cc/cm$^3$/sec or greater, and the powder leakage rate is 10% or less (samples a to i of Examples).

When the average fiber diameter is smaller than 18 μm in the spunbonded nonwoven fabric of the first layer, transparency is decreased and becomes less than 40% in the sheet material for extraction (sample j of Comparative Examples).

When the average fiber diameter is smaller than 16 μm in the meltblown nonwoven fabric of the second layer, transparency of the sheet material for extraction is decreased and becomes less than 40% (sample o of Comparative Examples).

When the basis weight is smaller than 2 g/m$^2$ in the meltblown nonwoven fabric of the second layer, the 3% modulus is decreased and becomes less than 5.5 N in the sheet material for extraction (samples k, l, m, s, and t of

TABLE 2

| | | Sample | | | | | | | | | | |
|---|---|---|---|---|---|---|---|---|---|---|---|---|
| | | j | k | l | m | n | o | p | q | r | s | t |
| Sheet Material for Extraction | Total Fiber Length (m/cm$^2$) | 4.86 | 3.85 | 3.02 | 3.17 | 4.82 | 4.95 | 3.18 | 3.1 | 4.91 | 3.27 | 3.21 |
| | Basis Weight (g/m$^2$) | 15 | 17.4 | 13.4 | 17.4 | 28.5 | 22 | 22 | 16 | 22 | 12 | 15.5 |
| | 3% Modulus (N) | 7.2 | 4.7 | 4.5 | 4.5 | 7.1 | 7.6 | 6.4 | 5.6 | 6.5 | 5.1 | 5.3 |
| | Transparency (%) | 38.8 | 47.2 | 49.1 | 48.4 | 39.1 | 37.1 | 50.1 | 52.9 | 39.2 | 47.5 | 48.1 |
| | Quantity of Airflow (cc/cm$^3$/sec) | 410 | 499 | 621 | 589 | 360 | 437 | 580 | 680 | 401 | 685 | 691 |
| | Powder Leakage Rate (%) | 4.62 | 8.9 | 12.5 | 10.8 | 2.15 | 4.52 | 13.5 | 11.5 | 3.07 | 8.9 | 9.52 |
| First Layer | Average Fiber Diameter (μm) | 17.2 | 21 | 21 | 23.5 | 21 | 27.7 | 29.2 | 23.8 | 21 | 18.4 | 21 |
| | Basis Weight (g/m$^2$) | 11 | 16 | 12 | 16 | 16 | 18 | 16 | 12 | 18 | 12 | 15.5 |
| Second Layer | Average Fiber Diameter (μm) | 16 | 16 | 16 | 16 | 28 | 11.5 | 16 | 18 | 18 | — | — |
| | Basis Weight (g/m$^2$) | 4 | 1.4 | 1.4 | 1.4 | 12.5 | 4 | 4 | 4 | 4 | — | — |

From Table 2 described above, the following matters can be understood.

When the average fiber diameter is more than 28 μm in the spunbonded nonwoven fabric of the first layer, the powder leakage rate is more than 10% in the sheet material for extraction, and thus powder leakage is likely to occur (sample p of Comparative Examples).

Comparative Examples). Furthermore, the powder leakage rate exceeds 10% in the sheet material for extraction, and powder leakage is likely to occur (samples l and m of Comparative Examples).

When the basis weight is more than 8 g/m$^2$ in the meltblown nonwoven fabric of the second layer, transparency is decreased and becomes less than 40% in the sheet material for extraction. Furthermore, the quantity of airflow is decreased and becomes less than 400 cc/cm$^3$/sec, and the extraction properties become insufficient (sample n of Comparative Examples).

When the total fiber length is more than 4.8 m in the sheet material for extraction, transparency is decreased and becomes less than 40% in the sheet material for extraction (samples j, o, and r of Comparative Examples).

When the total fiber length is shorter than 3.3 m in the sheet material for extraction, the powder leakage rate is more than 10% in the sheet material for extraction, and powder leakage is likely to occur (samples l, m, p, and q of Comparative Examples).

INDUSTRIAL APPLICABILITY

The sheet material for extraction, the extraction filter, and the extraction bag according to the invention have excellent transparency and extraction properties and are less likely to cause powder leakage. Therefore, these can be suitably utilized in the fields of a sheet for extraction, an extraction filter, and an extraction bag, which are used for the extraction of beverages such as black tea, green tea, and coffee; liquid food products such as soup; medicines such as Chinese herbal medicines; or quasi-drugs such as a bathing agent.

REFERENCE SIGNS LIST 1 extraction filter
2 filter portion
3 planarly adhered portion
4 upper edge
5 extraction bag
6 bag body
7 linearly adhered portion
8 tagging thread
9 tag

The invention claimed is:

1. A sheet material for extraction comprising:
    a first layer including a spunbonded nonwoven fabric formed from polyester-based fibers having an average fiber diameter of 18 to 28 μm and a basis weight of 8 to 19 g/m$^2$; and
    a second layer including a meltblown nonwoven fabric formed from polyester-based fibers having an average fiber diameter of 16 to 28 μm and a basis weight of 2 to 8 g/m$^2$,
    wherein the sheet material for extraction has a sum of the lengths of all fibers included in 1 cm$^2$ of the sheet material for extraction of 3.3 to 4.8 m and a 3% modulus of 5.5 N or higher.

2. The sheet material for extraction according to claim 1, wherein the sheet material for extraction has a transparency of 40% or higher, a quantity of airflow of 400 cc/cm$^3$/sec or greater, and a powder leakage rate of 10% or less.

3. An extraction filter comprising the sheet material for extraction according to claim 1,
    wherein the extraction filter is formed by superposing the sheet material for extraction with the second layer being disposed on the inner side, and adhering the sheet material for extraction at predetermined sites.

4. An extraction bag comprising the sheet material for extraction according to claim 1,
    wherein the extraction bag is formed by superposing the sheet material for extraction with the second layer being disposed on the inner side, and adhering the sheet material for extraction at predetermined sites to form a bag body with which an extraction material has been filled.

5. An extraction filter comprising the sheet material for extraction according to claim 2,
    wherein the extraction filter is formed by superposing the sheet material for extraction with the second layer being disposed on the inner side, and adhering the sheet material for extraction at predetermined sites.

6. An extraction bag comprising the sheet material for extraction according to claim 2,
    wherein the extraction bag is formed by superposing the sheet material for extraction with the second layer being disposed on the inner side, and adhering the sheet material for extraction at predetermined sites to form a bag body with which an extraction material has been filled.

* * * * *